Oct. 23, 1945.   F. E. WOLCOTT   2,387,425
COFFEE PERCOLATOR
Filed July 28, 1942

INVENTOR.
FRANK E. WOLCOTT.
BY
Louis V. Lucia
ATTORNEY.

Patented Oct. 23, 1945

2,387,425

UNITED STATES PATENT OFFICE 2,387,425

COFFEE PERCOLATOR

Frank E. Wolcott, West Hartford, Conn., assignor to The Silex Company, Hartford, Conn.

Application July 28, 1942, Serial No. 452,570

1 Claim. (Cl. 99—310)

This invention relates to coffee percolators and more particularly to percolators having a liquid container, or lower bowl, with a coffee container mounted thereon and a pump for forcing liquid from the liquid container to the coffee container from which the liquid percolates through coffee grounds and back into the lower container.

An object of this invention is to provide, for such a coffee percolator, a pump and filter of novel construction and which may be produced from materials such as porcelain, glass or the like.

A further object is to provide a coffee grounds container which will operate as an external coffee basket and thereby eliminates the requirement of a separate and internal coffee basket such as usually required in coffee makers of the percolator type.

A further object is to provide a coffee percolator which will require removal of the coffee grounds container and pump unit before coffee can be served from the lower bowl.

Further objects of the invention will be more clearly understood from the following description and from the accompanying drawing in which.

Figure 1:
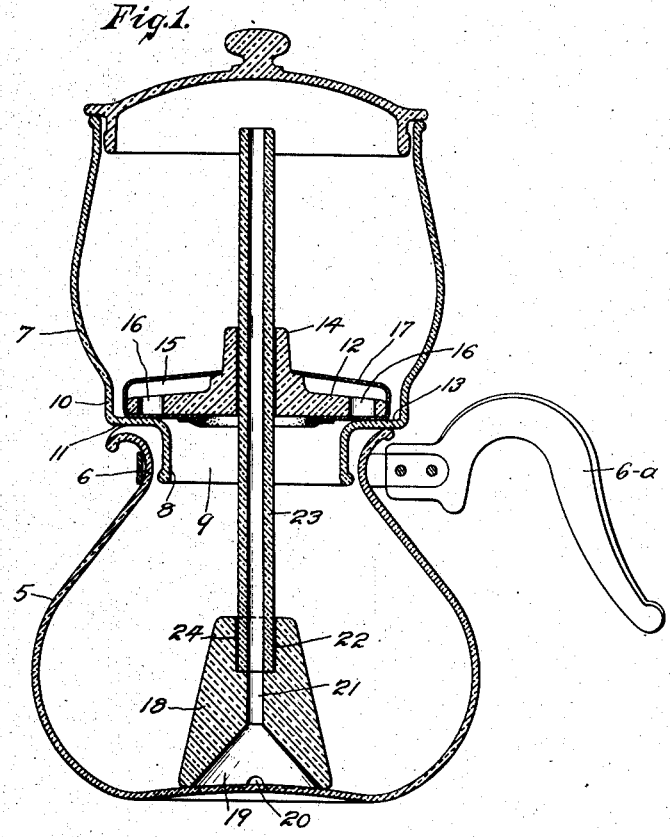
Fig. 1 is a view in central vertical section illustrating a coffee percolator embodying my invention.
Figure 2:
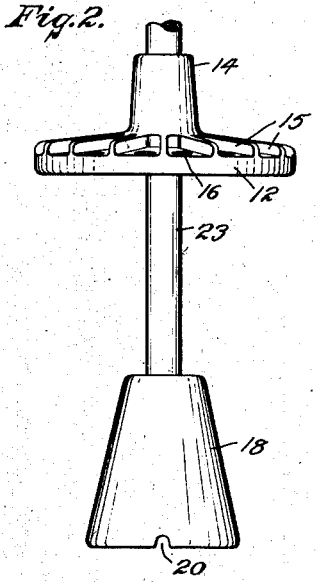
Fig. 2 is an elevational side view of the drainer plate and pump unit.
Figure 3:
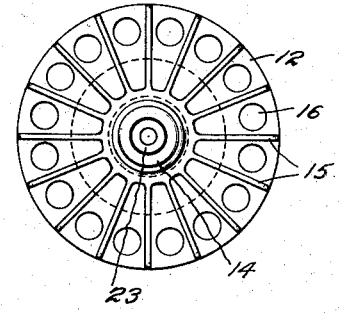
Fig. 3 is a plan view of said unit.

As shown in the drawing, my improved percolator comprises a lower container 5 having a neck portion 6 and a handle 6—a attached thereto.

A coffee container 7 is seated upon the top of the container 5 and has a skirt 8 surrounding an opening 9 and depending into the neck of the container 5.

The wall of said container 7 is provided with an outward projection 10 which forms a shoulder 11 that is seated upon the upper edge of the container 5 to support the container 7 thereon while the depending skirt 8 will position it against displacement on the lower container and also direct the flow of liquid from the upper container to the lower container.

The filtering and pumping unit for my imprived percolator may comprise a drainer plate 12 which is seated upon an annular ledge 13 that is provided in the interior of the projection 10. The said drainer plate is preferably formed with a central boss 14, a plurality of ribs 15 radiating from said central boss to the peripheral edge of the drainer plate and apertures 16 which extend through the drainer plate between the said ribs.

A strainer member 17, such as a disk or sheet of pervious material is attached to the said drainer plate, rests upon the upper edges of the ribs 15 and extends downwardly along the peripheral edge of the plate and underneath said plate between the bottom thereof and the ledge 13.

A pump for forcing water from the lower container 5 into the upper container 7 is provided and consists of a base 18 having a recess 19 in the bottom thereof to form a pump chamber. The said pump chamber is provided with a passage in the form of a notch 20, in the bottom edge of said base 18, to permit liquid to enter from the container 5 into said chamber 19. A passage 21 extends upwardly in the base from the chamber 19 and connects with a recess 22 preferably provided to receive the end of a tube 23 which extends through an opening in the boss 14 on the drainer plate 12, to a position above the bottom of the container 7 and communicates the chamber 19 with the said container.

The said base 18 and tube 23 may be formed of such materials as porcelain, glass, or the like, and the tube may be permanently connected to the base by means of a suitable cement indicated at 24 or, if preferred, the said tube and base may be formed as an integral structure.

In the operation of the above described coffee percolator, water is placed in the lower container 5 and coffee grounds are placed in the upper container 7 over the strainer member 17. The water in the lower container will then enter through the passage 20 into the pumping chamber 19 and the opening 21. When said water is heated, that portion which is contained within the chamber 19 will be forced upwardly through the tube 23 and out from the top of said tube, into the container 7 and over the coffee grounds therein. The water in the upper container then percolates through the coffee grounds, is filtered by means of the strainer 17 and passes through the opening 9 back into the lower container as a coffee brew.

It will be noted that my invention provides a novel structure wherein the equivalent of the conventional form of a coffee basket, such as commonly used in percolators, is provided by the upper container itself, which receives the coffee grounds directly therein and thereby functions as an external coffee basket. This permits a saving in the amount of space and in the size of the upper container which is required with separate coffee baskets as commonly used.

The base 18 of the pumping unit is of a substantially heavy construction so as to provide sufficient weight for retaining the said base and tube 23 upon the bottom of the container 5 and against the upward pressure which is caused by the pumping action within the chamber 19. Further, it is pointed out that the walls of the base 18 and the tube 23, which enclose the pumping chamber 19, the passage 21 and the interior of the tube 23, of my improved pumping unit, are made substantially thick so that, being constructed of a material having inherent insulating qualities, they provide insulation between the liquid within and that outside of said pumping unit and thereby increase the pumping efficiency of said unit.

It will also be noted that the base 18 of the pumping unit simply rests upon the bottom of the lower bowl 5 and is free to slide to one side of the lower bowl should it be tipped for pouring coffee therefrom without the container 7 and the entire pumping unit having first been removed. The base 18 is retained in central position in the lower bowl by means of the drainer plate 12 which is sufficiently wide to retain the tube 23 and base in proper alignment. However, said base, upper container and drainer plate 12 have been purposely made capable of displacement, upon tipping of the entire percolator, in order to render it necessary that the said members be removed from the lower bowl, before coffee can be poured therefrom, and thereby eliminate the possibility of breakage of these parts should the entire percolator be tipped to a point where they would fall off the lower bowl.

I claim:

In a coffee maker of the character described, the combination of a lower bowl, an upper bowl having a substantially flat bottom seated upon said lower bowl and a central opening in said bottom, an annular wall portion defining said opening and depending into said lower bowl, a drainer member seated upon said bottom over said opening, a pump member in said lower bowl, a tube extending upwardly from said pump member through said drainer member, a vertical boss on said drainer plate surrounding said tube, and a strainer sheet of pervious material surrounding said boss and extending outwardly therefrom over and under said drainer plate.

FRANK E. WOLCOTT.